(12) United States Patent
Zimmer et al.

(10) Patent No.: US 12,497,320 B2
(45) Date of Patent: Dec. 16, 2025

(54) METHOD AND APPARATUS FOR PRODUCING THIN GLASS AND THIN GLASS RIBBON PRODUCED THEREBY

(71) Applicant: SCHOTT AG, Mainz (DE)

(72) Inventors: José Zimmer, Eppstein (DE); Holger Wegener, Alfeld/Leine (DE); Alexander Storch, Alfeld/Leine (DE)

(73) Assignee: SCHOTT AG, Mainz (DE)

( * ) Notice: Subject to any disclaimer, the term of this patent is extended or adjusted under 35 U.S.C. 154(b) by 969 days.

(21) Appl. No.: 17/326,443

(22) Filed: May 21, 2021

(65) Prior Publication Data

US 2021/0269347 A1 Sep. 2, 2021

Related U.S. Application Data

(63) Continuation of application No. PCT/EP2019/081875, filed on Nov. 20, 2019.

(30) Foreign Application Priority Data

Nov. 21, 2018 (DE) ...................... 10 2018 129 349.6

(51) Int. Cl.
C03B 17/06 (2006.01)
C03B 33/023 (2006.01)
C03C 3/093 (2006.01)

(52) U.S. Cl.
CPC .......... *C03B 17/064* (2013.01); *C03B 17/068* (2013.01); *C03B 33/0235* (2013.01); *C03C 3/093* (2013.01)

(58) Field of Classification Search
CPC .................................................. C03B 17/064
See application file for complete search history.

(56) References Cited

U.S. PATENT DOCUMENTS 8,528,364 B2 9/2013 Anderson
9,108,873 B2 8/2015 Maeda
(Continued)

FOREIGN PATENT DOCUMENTS

CN 101312918 11/2008
CN 102869622 1/2013
(Continued)

OTHER PUBLICATIONS

English translation of the International Preliminary Report on Patentability dated May 25, 2021 for PCT/EP2019/081875, 7 pages.
(Continued)

*Primary Examiner* — William P Watkins, III
(74) *Attorney, Agent, or Firm* — Ruggiero McAllister & McMahon LLC (57) ABSTRACT

A method for producing a flat thin glass ribbon is provided. The method includes the steps of drawing melted glass downward away from a tank in a pulling direction while applying tensile forces which act in the pulling direction to form the thin glass ribbon having a thickness of at most 250 μm and cooling the thin glass ribbon until a temperature of the thin glass ribbon undershoots a glass transition temperature. The tensile forces are transferred to the thin glass ribbon by at least two pairs of drawing rollers. The at least two pairs of drawing rollers are spaced apart transversely to the pulling direction and contact the thin glass ribbon on longitudinal edges of the thin glass ribbon. The thin glass ribbon only makes contact with the at least two pairs of drawing rollers at a position where the temperature of the thin glass ribbon is at most at or below 500° C.

17 Claims, 4 Drawing Sheets

(56) References Cited

U.S. PATENT DOCUMENTS

| | | | |
|---|---|---|---|
| 2007/0022781 A1 | 2/2007 | Aoki | |
| 2007/0062219 A1 | 3/2007 | Blevins | |
| 2008/0020919 A1* | 1/2008 | Murata | C03C 21/002 |
| | | | 501/66 |
| 2013/0118206 A1* | 5/2013 | Maeda | C03B 17/067 |
| | | | 65/194 |
| 2014/0283554 A1 | 9/2014 | Fredholm | |
| 2016/0257596 A1 | 9/2016 | Filippov | |
| 2017/0001898 A1 | 1/2017 | Ortner | |
| 2018/0141848 A1 | 5/2018 | Aburada | |
| 2018/0327296 A1* | 11/2018 | Cimo | C03C 3/097 |

FOREIGN PATENT DOCUMENTS

| | | |
|---|---|---|
| EP | 1746076 | 1/2007 |
| JP | H1053426 | 2/1998 |
| JP | 2011016705 | 1/2011 |
| KR | 20140007253 | 1/2014 |
| WO | 2008093153 | 8/2008 |
| WO | 2015197597 | 12/2015 |

OTHER PUBLICATIONS

English translation of the Written Opinion of the International Searching Authority dated Feb. 10, 2020 for PCT/EP2019/081875, 6 pages.

International Search Report dated Feb. 10, 2020 for PCT/EP2019/081875.

* cited by examiner

METHOD AND APPARATUS FOR PRODUCING THIN GLASS AND THIN GLASS RIBBON PRODUCED THEREBY

CROSS REFERENCE TO RELATED APPLICATIONS

This application is continuation of International Application PCT/EP2019/081875 filed Nov. 20, 2019, which claims benefit under 35 USC § 119 of German Application DE 2018 10 129 349 filed Nov. 21, 2018, the entire contents of which are incorporated by reference herein.

BACKGROUND

1. Field of the Invention

The invention relates in general to the production of sheet-like glass elements by hot forming processes. In particular, the invention relates to the production of very thin glasses.

2. Description of Related Art

Extensive production of very thin glasses with thicknesses of less than 250 μm is still a particular challenge, especially when high demands are placed on the surface quality and the maximum variation in thickness.

One possibility for producing very thin glasses is to thin a relatively thick glass sheet to the desired thickness. The thinning may be affected, for example, by etching. An arrangement and a method relating thereto are described for example in KR1020140007253 A.

Such reworking is, however, expensive and time-consuming.

WO 2008/093153 A1 describes a production method in which a hollow preform is inflated. In that case, however, the thin glass created in this way is initially hollow-cylindrical and not flat, as is required for many applications.

The invention is therefore based on the object of simplifying the production of very thin glasses, increasing the stability of the production process and, as a result, also improving the quality of the thin glasses.

SUMMARY

The invention accordingly provides a method for producing a flat thin glass ribbon, in which method glass is melted and emerges from a tank guiding the glass melt and is drawn out away from the tank downward to form the thin glass ribbon having a thickness of at most 250 μm by applying tensile forces which act in the longitudinal direction, the thin glass ribbon being cooled after it emerges until it undershoots the glass transition temperature $T_g$, and the tensile forces being transferred to the thin glass ribbon by at least two pairs of drawing rollers, the two pairs of drawing rollers being arranged spaced apart transversely to the pulling direction, in order to take hold of the thin glass ribbon on either side in the region of its longitudinal edges in each case between two drawing rollers, and the thin glass ribbon only making contact with drawing rollers at a position at which the temperature of the glass is at most at or below 500° C.

Corresponding to this, also provided is an apparatus for producing a flat thin glass ribbon, having a tank for receiving a glass melt, from which the molten glass emerges and can be drawn off downward, and also a cooling device, in order to cool down in a controlled manner the thin glass ribbon which has emerged from the tank. The apparatus also comprises a pulling device, in order to exert tension on the thin glass ribbon and thus to draw out the thin glass ribbon to a thickness of at most 250 μm, the pulling device for exerting the tensile force comprising at least two pairs of drawing rollers, which are arranged spaced apart from one another transversely to the pulling direction, in order to take hold of the thin glass ribbon in each case between two drawing rollers, the drawing rollers being arranged downstream of the cooling device and spaced far enough apart from the nozzle that the thin glass ribbon only makes contact with a drawing roller at a temperature of the glass of at most 500° C.

In this respect, the relevant temperature is the temperature at the location of contact between drawing roller and glass ribbon.

In addition, the drawing roller pairs are spaced far enough apart from one another that they are not located in the quality surface or in the quality region of the glass ribbon, but operate outside in the surface which is cut off later in the process, with the result that drawing rollers do not make contact with the quality surface of the glass. Expressed differently, the drawing rollers are thus arranged so far apart from one another that they make contact only with edge-side regions which are cut off later in the form of borders.

The glass transition temperature, which is also referred to as the transformation point, is the temperature at which the glass transitions from the viscous into the solid range. The glass transition temperature Tg is typically close to the upper annealing point at a glass viscosity of approximately $10^{12}$ Pa·s. The temperature of 500° C., at which the drawing rollers make contact with the glass, is below the temperature of the strain point and thus also below the glass transition temperature for the glasses provided for processing.

For the method or the apparatus, the down-draw process and the overflow fusion process can be applied. In the overflow fusion process, the tank is in the form of an overflow trough, the glass melt emerging at the top and running in two glass streams over both sides of the overflow trough, and the two glass streams combining underneath the overflow trough to form a glass ribbon. This still hot and viscous glass ribbon is then drawn off to form the thin glass ribbon. In the down-draw process, the tank has an elongate nozzle, from which the glass melt flows away or emerges downward.

The measures described here make it possible in particular to also draw extremely thin glasses reliably and with a low deviation in thickness. Particular attention is therefore given to a method in which a thin glass ribbon having a thickness of at most 100 μm, in particular at most 70 μm, preferably at most 50 μm is drawn. Still thinner glasses having thicknesses of 30 μm or less can also be produced.

The drawing rollers are arranged underneath the tank, and therefore the drawing rollers exert vertical tension on the thin glass ribbon moving downward.

In the case of the very thin glass ribbons as are created by the method, the cooling section between the nozzle and the position at which the glass transition temperature is reached can be kept short. This is expedient for restricting external influences on the thickness of the glass ribbon, for instance vibrations which propagate along the thin glass ribbon. According to one development, it is provided that the spacing between the position of the temperature $T_g$ and the point where the glass detaches from the tank is less than 2 meters. In the down-draw process, the point where the glass detaches from the tank is given by the nozzle opening or by the end of a blade inserted in the nozzle, at which blade the glass runs off. In the overflow fusion process, this point is given by the tank bottom side at which the glass streams meet, combine and flow off downward.

It is also expedient when the spacing between the point where the glass detaches from the tank and the point of contact of the drawing rollers and the thin glass ribbon is in the range of 2 to 4 meters.

Preferred drawing speeds are between 0.4 meter per minute and 50 meters per minute. The thinner the thin glass ribbon is, the faster the ribbon is drawn, with the result that the amount of glass processed remains approximately constant according to one embodiment. The adaptation of the drawing speed to the glass thickness has also proven to be expedient especially in terms of the attenuation of deviations in thickness. It is thus provided according to one embodiment of the invention that the thin glass ribbon is drawn at a speed which depends on the thickness of the thin glass ribbon, with the result that the product of the drawing speed, reported in meters per minute, and the glass thickness, reported in micrometers, is between 200 and 1000 (corresponding to $2*10^4$ m²/min to $10*10^4$ m²/min). The product mentioned above is preferably in a range of 200 to 900.

DETAILED DESCRIPTION

Figure 1:
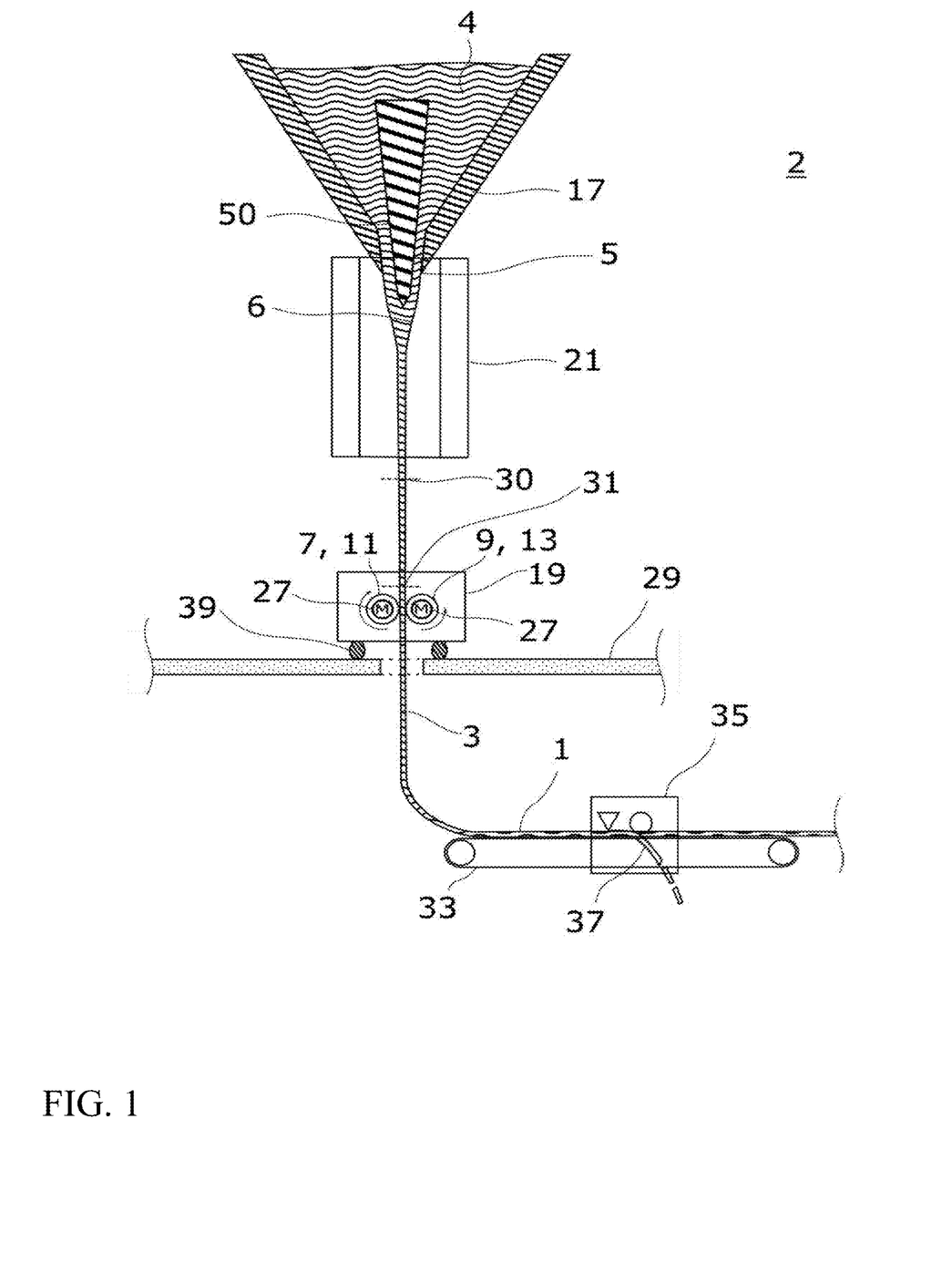
FIG. 1 schematically shows an apparatus for producing thin glass ribbons in the down-draw process.

FIG. 1 schematically shows a preferred embodiment of an apparatus 2 for producing a thin glass ribbon 1. The apparatus 2 for producing a flat thin glass ribbon 1 comprises a tank 17 for receiving a glass melt 4. The molten glass emerges from the tank and is drawn off downward. According to a preferred embodiment, the tank 17 has at its bottom side a nozzle 5, from which the glass melt 4 emerges.

In order to obtain an extended thin glass ribbon 1, the nozzle 5 has an elongate, in particular slot-like, form. FIG. 1 shows the arrangement as seen in the direction of an edge of the glass ribbon. The elongation of the nozzle 5 is accordingly perpendicular to the plane of illustration here and therefore cannot be seen in the figure. If the glass, as also in the illustrated example, is drawn off from a downwardly open nozzle 5, this is referred to as a down-draw process.

In a variant of the down-draw process, a blade 50 is inserted in the nozzle and protrudes out of the nozzle 5. Here, the glass melt flows along the blade 50 on both sides and the two partial streams combine at the lower end of the blade. As a result of the drawing off, the thickness of the glass ribbon 1 reduces in the region from the end of the blade 50 until the glass 3, in the course of the simultaneously performed cooling, has become sufficiently solid and no longer deforms. This region of decreasing thickness is also referred to as the drawing bulb 6. In order to cool the glass 3 down in a controlled manner, a cooling device 21 is provided. Here, it is important that the cooling device 21 does not necessarily perform active cooling. Rather, it serves to control, optionally even to slow down, the cooling operation. The cooling device may therefore comprise heating devices, as is the case in annealing lehrs, in order to counteract cooling that is too quick. It is advantageous here when the cooling can be controlled not only in the drawing direction but also transversely to the drawing direction, since precisely the transverse gradients of the temperature in the glass ribbon are conjointly responsible for variations in thickness and persistent stresses. According to one embodiment, heating/cooling modules are therefore installed in the cooling device 21 that have a maximum extent of 100 mm, better 50 mm and preferably 25 mm in the transverse direction. Said heating/cooling modules may be activated separately in order to be able to affect the temperature distribution. In this way, it is provided that the temperature gradients can be reduced transverse to the glass ribbon during the cooling process. To control these gradients, according to one development a thermal camera which can measure the glass transition temperature transverse to the drawing direction of the glass ribbon is installed downstream of the cooling device. The temperature gradients in the glass ribbon are thus set to max. 0.1 K/cm. In this way, the glass ribbon obtains a good constancy of thickness at the end, has low stresses and can be processed further without breaking.

The glass 3 of the thin glass ribbon 1 is thus cooled down, and during this cooling down is moved away from the nozzle 5 in the pulling direction until it reaches the glass transition temperature $T_g$ at a position 30.

The apparatus 2 furthermore has a pulling device 19 in order to exert tension on the thin glass ribbon 1. The tensile force reaches along the thin glass ribbon 1 as far as the deformation zone or the drawing bulb 6, so that as a result the thin glass ribbon 1 is drawn off to a thickness of at most 250 µm. In particular, it is also possible for a thin glass ribbon 1 having a thickness of at most 70 µm, or even of at most 50 µm, to be drawn. The thin glass ribbon 1 in this way has a fire-polished surface with correspondingly low roughness by contrast for instance to thinly etched glasses. In particular, the roughness of the glass surface can be less than or equal to 5 nm, preferably less than or equal to 2 nm, more preferably at most 1 nm or even only at most 0.5 nm.

For exerting the tensile force, the pulling device 19 comprises at least two pairs of drawing rollers 7, 9, 11, 13, which are arranged spaced apart from one another transversely to the pulling direction. On the basis of the illustration of FIG. 1, looking toward the glass edges, the rollers are spaced apart perpendicularly to the plane of illustration, and therefore one pair of drawing rollers 11, 13 is concealed by the other pair of drawing rollers 7, 9. As can be derived from the illustration, the drawing rollers 7, 9, 11, 13 are arranged downstream of the cooling device 21 and are arranged spaced far enough apart from the nozzle 5 that the thin glass ribbon 1 only makes contact with any of the drawing rollers 7, 9, 11, 13 at a temperature of the glass which is below the glass transition temperature $T_g$. The drawing rollers are accordingly arranged only downstream of the position 30 as viewed in the direction of movement of the thin glass ribbon 1.

The thin glass ribbon 1 may particularly advantageously be deflected horizontally and be further processed with a horizontal advancement. This is advantageous in general in order to utilize the gravitational force acting on the glass for smooth and simple storage on a horizontal support device 33, for example on transport rollers or, as illustrated, on one or more transporting belts.

A further processing operation is, for example, cutting off the borders 37 produced when the thin glass ribbon is being drawn by means of a border cutting off device 35. The borders 37 are represented as thickened edge strips of the glass ribbon 1. Said borders are often undesirable for the further processing, for example since the borders make a bending operation for rolling up the thin glass ribbon 1 to form a roll more difficult. The borders 37 may, for example, be cut off by scoring and breaking and collected in a scrap bunker. The glass of the borders can then be fed to the glass melt again and reused. As is also the case in the example illustrated, it is expedient in general when the borders are cut off after passage of the thin glass ribbon 1 through the pulling device 19, or that a border cutting off device 35 is provided which is arranged downstream of the pulling device 19 in the direction of movement of the thin glass ribbon 1. As already stated above, the drawing rollers 7, 9, 11, 13 are preferably arranged at the edge to the extent that they do not touch the quality surface of the glass ribbon, but only the respective strips, or borders 37, at the edge that are cut off by the border cutting off device 35 arranged downstream of the drawing rollers in the running direction. Without being restricted to the example illustrated, the two pairs of drawing rollers 7, 9, 11, 13 are arranged spaced far enough apart transverse to the pulling direction that they touch the thin glass ribbon 1 only at the borders 37, or more generally the regions which are cut off subsequently from the thin glass ribbon 1 by the border cutting off device 35.

The displacement of the drawing rollers in a region in which the glass is already solid has proven to be particularly advantageous in order to achieve a low variation in thickness in the glass ribbon. This is surprising insofar as an arrangement of the rollers close to the drawing bulb 6 per se should allow good control of the current drawing speed by avoiding deviations in synchronization. However, in the case of tension at a position at which the glass can still be shaped, tensile stresses which result downstream of the drawing rollers may still have an effect on the thickness or more generally on the glass quality.

Therefore, it is understood that the thin glass ribbon 1 only makes contact with drawing rollers 7, 9, 11, 13 at a position at which the temperature of the glass is at most at or below 500° C. It is conceivable that the glass ribbon still comes into contact with a component of the apparatus also above these drawing rollers, but said contact should then be minor enough that the shape and surface of the glass ribbon remains substantially unaffected. Gentle guidance would be conceivable, for example, in order to stabilize the horizontal position of the glass ribbon. Said guidance should, however, not exert any significant forces. Thus, at least 90% of the tensile forces which are transferred to the glass ribbon should be exerted by one or more pairs of drawing rollers with a contact point at a glass transition temperature of 500° C. or lower.

In general, without being restricted to the example illustrated, it is particularly preferable when the drawing rollers grip the thin glass ribbon 1 at a position at which the temperature of the glass 3 is not only below $T_g$ but is less than 100° C. This position is depicted likewise by way of example in FIG. 1.

The positioning of the drawing rollers 7, 9, 11, 13 at this location makes it possible to use materials for the drawing rollers that are different than otherwise conventional refractory materials, such as metal or in particular ceramic materials. Metallic drawing rollers may damage the glass surface and, on account of the low adhesion, result in slip-stick movements which are manifested as deviations in thickness in the thin glass ribbon 1. According to one embodiment of the invention, the drawing rollers are provided with a surface of elastomeric material. This embodiment is not necessarily restricted to a temperature of the glass of at most 100° C., since elastomeric materials which are resistant to high temperatures, such as for example fluoroelastomers or silicones, are also known. Elastomeric surfaces generally adhere well to glass. Moreover, these materials also dampen vibrations which may lead to deviations in thickness as a result of propagation as far as the drawing bulb 6. In the case of a contact point of the drawing rollers at a temperature of 100° C. or less, a further advantage is also that in general not only the glass transition temperature, but also the annealing point and strain point of the glass, are undershot at this temperature. This avoids the introduction and preservation of stresses in the glass when a contact pressure is being applied by the drawing rollers during the cooling process. In general, without being restricted to the embodiment with a roller contact at at most 100° C., according to another embodiment of the invention it is provided that the temperature of the strain point of the glass 3 is undershot at the position at which the drawing rollers 7, 9, 11, 13 touch the thin glass ribbon 1.

According to a further embodiment, the pulling device 19 is mounted on damping elements 39 in order to suppress the transmission of vibrations to the thin glass ribbon 1 via the drawing rollers. According to a further embodiment, the pulling device 19 in particular has a configuration which is as heavy as possible. This precisely makes it possible to dampen low-frequency vibrations at frequencies especially below 1 hertz. These vibrations prove to be especially serious in terms of deviations in thickness. According to one embodiment, a mass of at least 300 kg is provided as the weight of the unit. For this purpose, the drives 27 for the drawing rollers 7, 9, 11, 13 may be integrated in the pulling device 19, as shown in the example. With the mounting of the pulling device 19 on damping elements on the floor of the manufacture building, a decoupling of vibrations in a support structure of the apparatus 2 is achieved.

In general, without being restricted to the example illustrated or to the embodiments mentioned above, it may be provided in one development that the transmission of vibrations to the thin glass ribbon 1 at frequencies smaller than 1 hertz is attenuated by at least 10 dB by the mechanical damping of elements which come into contact with the thin glass ribbon 1.

In a preferred configuration of the invention, the pulling device 19 is mounted on the floor, as illustrated. The floor may also be a storey slab 29, as in the illustration.

Figure 2:
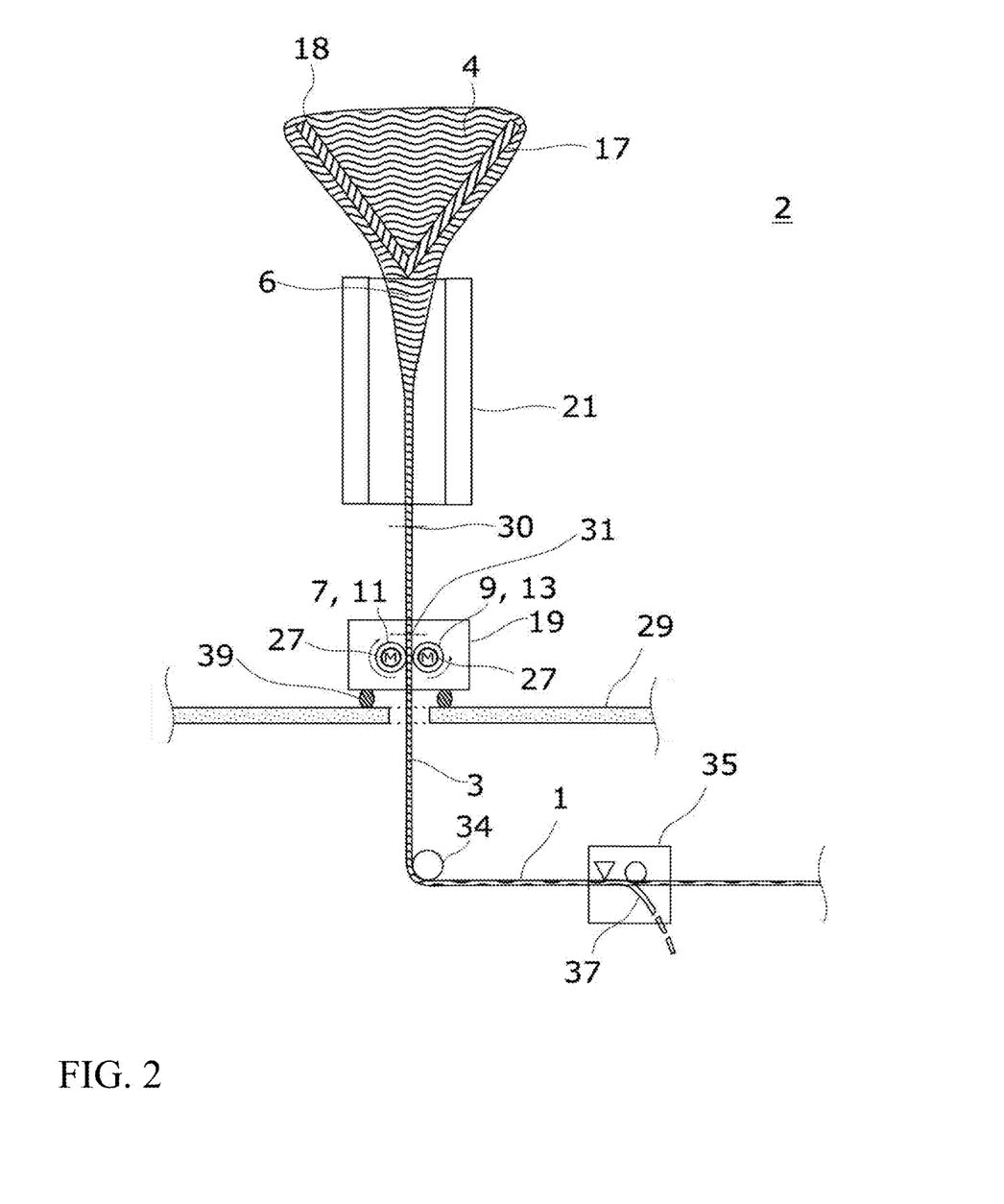
FIG. 2 shows a variant in which the glass ribbon is drawn in the overflow fusion process.

FIG. 2 shows a variant of the embodiment illustrated in FIG. 1. This variant differs essentially by the shaping process of the thin glass ribbon 1. In the example of FIG. 1, the shaping takes place in a down-draw process by means of a downwardly open nozzle 5 of the tank 17, as mentioned. In the example shown in FIG. 2, the ribbon is shaped in what is known as the overflow fusion process. Here, the tank 17 is configured as a trough which is open at the top. The glass melt 4 is fed continuously, with the result that the glass melt 4 ultimately passes over the top edge 18 and flows downward along both outer sides of the tank. At the lower end of the tank 17, the two partial streams combine in the drawing bulb and are then drawn off to form a thin glass ribbon 1 by the action of the tensile forces exerted by the drawing rollers. It is also the case in the embodiment shown in FIG. 2 that the thin glass ribbon 1 is deflected from the vertical to the horizontal, a deflection roller 34 being used here. In particular in the case of thin glasses as are produced according to the present disclosure, it is however possible for a deflection to take place in which the thin glass ribbon hangs freely in the region of transition from the vertical to the horizontal, as shown in FIG. 1. This embodiment is particularly advantageous for avoiding the transmission of vibrations and movements in the horizontal processing region to the drawing region, in particular to the drawing bulb 6. In a preferred embodiment, without being restricted to the specific exemplary embodiments illustrated, it is accordingly provided that the thin glass ribbon 1 is deflected from the vertical and guided onward horizontally in a freely hanging manner. It is further in particular appropriate for processing steps which may generate vibrations or movements to be carried out in the horizontal position of the thin glass ribbon 1. A processing step which is particularly appropriate for this purpose is the cutting off of the borders, as is also illustrated. In one development of the invention, it is accordingly provided that the thin glass ribbon 1 preferably is deflected from the vertical and guided onward horizontally in a freely hanging manner, borders 37 being cut off from the thin glass ribbon 1 in the horizontal position of the thin glass ribbon 1.

Figure 3:
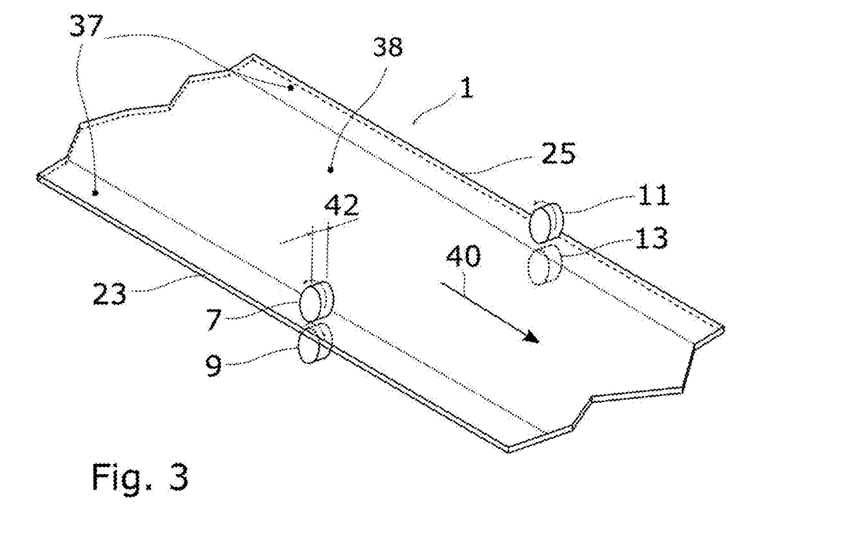
FIG. 3 shows the arrangement of two roller pairs on the thin glass ribbon.

For the purpose of clarification, FIG. 3 shows a perspective view of the arrangement of the pairs of rollers 7, 9 and 11, 13 on the thin glass ribbon 1. The thin glass ribbon 1 is moved in a direction of movement 40 in the longitudinal direction of the ribbon by the tensile force exerted by the driven drawing rollers. The pairs of drawing rollers are arranged spaced apart transversely to the direction of movement 40 or thus also transversely to the longitudinal direction of the thin glass ribbon 1. In particular, the drawing rollers may grip the ribbon in the region of the longitudinal edges 23, 25 where borders 37 have formed as a result of the drawing process.

The drawing of extremely thin glasses proves to be difficult owing to the no-longer substantial stiffness of the material on the macroscopic scale. It has been found to be very expedient in this context when the contact width 42 of the drawing rollers with the thin glass ribbon is narrow. The contact width is the width in which the tensile forces are transmitted to the thin glass ribbon 1. This corresponds to the width of the roller 7 in the example illustrated. This width does not necessarily have to correspond to the width of all the rollers. It is also possible, for example, to use pairs of different drawing rollers. If the drawing roller 9 were approximately twice as wide, the contact width 42 would nevertheless not increase, since the tensile forces are transmitted substantially only in the region in which there is contact with both opposite drawing rollers.

According to a preferred embodiment, the drawing rollers 7, 9, 11, 13 are formed and arranged such that the contact width of a pair of drawing rollers, along which tensile forces are transferred to the thin glass ribbon 1, is in the range of 10 mm to 50 mm. If the tensile forces are transferred to the thin glass ribbon 1 by a pair of oppositely arranged drawing rollers 7, 9, 11, 13 along a contact width 42 in the region mentioned above, it is possible to avoid shear stresses in the glass ribbon. These shear stresses can otherwise result in fold-like bulges owing to the low stiffness of the glass ribbon. The associated inhomogeneity of the tensile forces can propagate as far as the drawing bulb 6 and result in thickness inhomogeneities in the thin glass ribbon 1 there.

Without being restricted to the exemplary embodiments and independently of the above-described contact width, values in the range of 40 mm to 250 mm are generally advantageous for the diameter of the drawing rollers. The diameter is preferably here at most 200 mm. A diameter in the range of 40 mm to 150 mm is particularly preferred.

Figure 4:
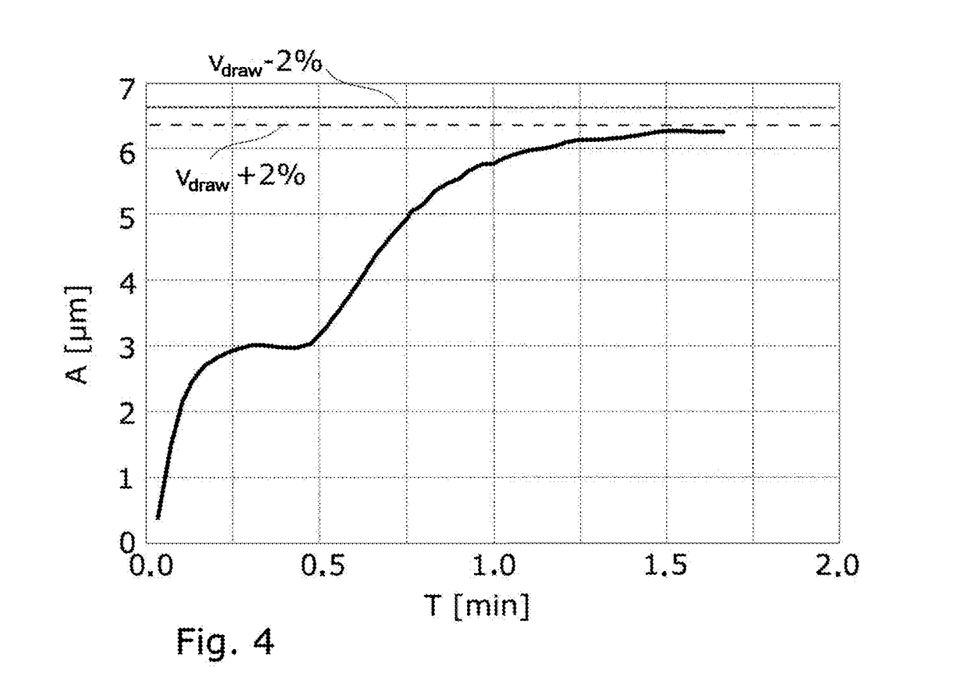
FIG. 4 is a graph in which the amplitude of the deviation in thickness of a thin glass ribbon is plotted as a function of the period of a deviation in the drawing speed.

FIG. 4 shows the effect of low-frequency disruptions, in particular in the form of vibrations, on the glass thickness of the thin glass ribbon. In FIG. 4, the thickness response is plotted as a function of the period of the deviation in the drawing speed. The amplitude of the response is reported in micrometers and denotes the difference between the maxima and minima of the glass thickness caused by the periodic changes. The period is reported in minutes. As the period increases, initially a significant rise is exhibited that reaches a plateau between period durations of 10 seconds to 0.5 minute. Here, the response does not significantly depend on the period duration. In the case of even larger period durations, the response increases in turn and converges to a value which constitutes the change in thickness at a drawing speed which is increased constantly by 2% ($v_{draw}+2\%$). This value is still somewhat smaller than the change in thickness in the case of a drawing speed that has been lowered by two percent once ($v_{draw}-2\%$).

However, these long period durations are typically no longer triggered by vibrations, but can rather be brought about by the process control. The range of the first rise in the deviations in thickness to the plateau, that is to say to period durations of approximately 10 seconds, is relevant in particular for the damping of mechanical vibrations.

Deviations in thickness owing to slow vibrations which are transmitted along the thin glass ribbon 1 in the longitudinal direction have an effect especially in the case of thin glasses. In order to suppress disruptive deviations in thickness with a short period, it is expedient here to adapt the drawing speed to the glass thickness of the thin glass ribbon 1. Specified in the following table are three exemplary embodiments, in which the spacing of the drawing rollers is also reported:

| Drawing speed [m/min] | Glass thickness [μm] | Spacing between the position of the annealing point and position 31 [meters] | Spacing between the drawing rollers and the drawing bulb 6 | Product of drawing speed (m/min) · glass thickness (μm) |
|---|---|---|---|---|
| 6 | 100 | 2 | 3 | 600 |
| 12 | 50 | 1.5 | 2.5 | 600 |
| 20 | 30 | 1.2 | 2.2 | 600 |

For the exemplary embodiments, a glass with a linear coefficient of thermal expansion at room temperature of $\alpha=9\cdot10^{-6}\,K^{-1}$ was drawn off to form a thin glass ribbon. The spacing of the hot forming zone, that is to say the drawing bulb 6, to the annealing point is one meter in all of the examples.

As can be seen with reference to the examples, the product of the drawing speed, reported in meters per minute, and the glass thickness, reported in micrometers, is between 200 and 900. In particular, this variable is constant at a value of 600 in the examples.

The drawing rollers 7, 9, 11, 13 of the pulling device 19 may be formed such that their position in the pulling direction or in the direction of movement of the thin glass ribbon 1 can be adjusted, with the result that the spacing between the drawing rollers and the drawing bulb 6, that is to say the spacing to the hot forming region of the thin glass ribbon 1, can be changed. In the examples in the table, the spacing to the drawing bulb is varied in the range of 2.2 meters to 3 meters. As can be seen with reference to the table, specifically a shorter spacing is selected with smaller glass thicknesses. The spacing may in particular be adapted to the temperature profile along the ribbon. As can be seen from the table, the spacing between the annealing point and the position 31 at which the glass has a temperature of 100° C. becomes shorter. Without being restricted to specific exemplary embodiments, it is therefore provided in general that the position of the drawing rollers in the direction of movement of the thin glass ribbon is set and thus adapted at a position at which the thin glass ribbon 1 reaches a predefined temperature as it cools. This position may correlate, for example, to the transformation point Tg, to the strain point or else to the position at which the glass reaches a temperature of 100° C. In this respect, the position of the drawing rollers does not have to coincide with the positions mentioned above. A correlation to these positions can also mean that a particular spacing between the contact point of the drawing rollers and one of these positions is maintained.

Figure 5:
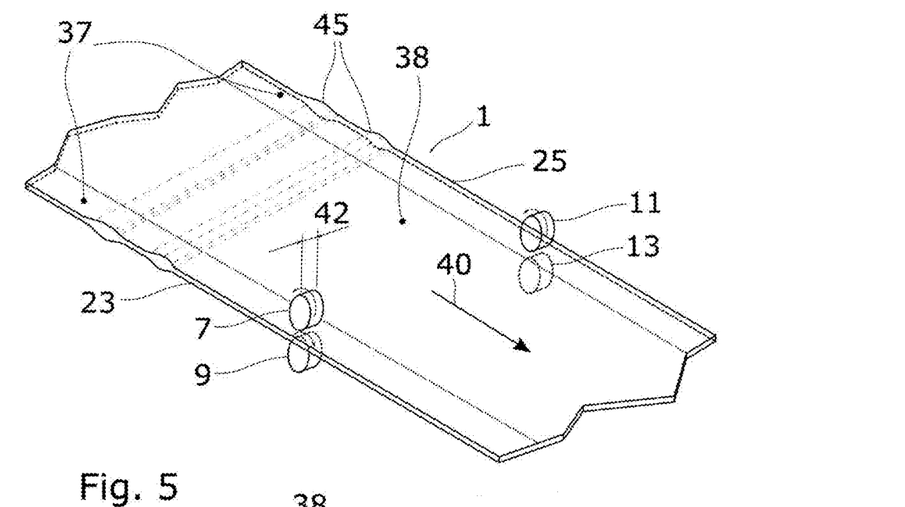
FIG. 5 and FIG. 6 show thin glass ribbons having different variations in thickness.
Figure 6:
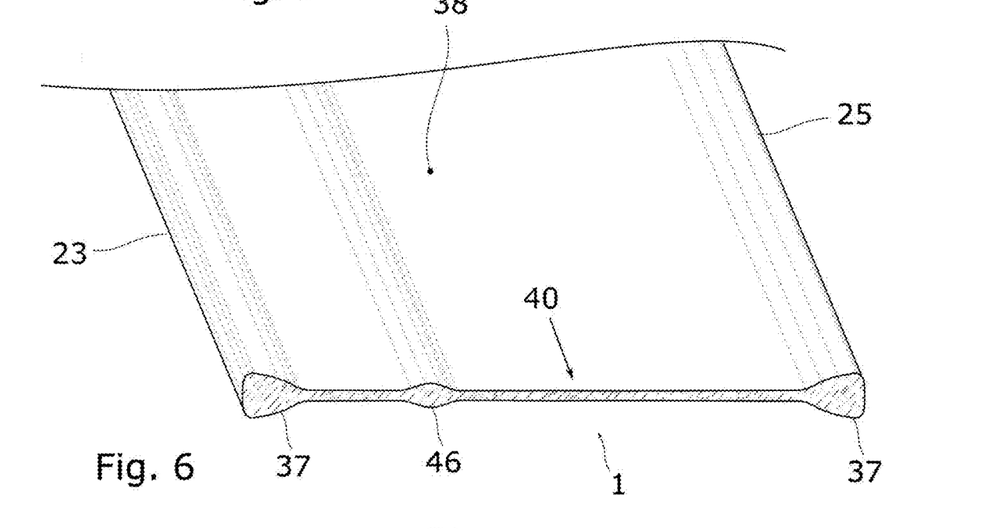

FIG. 5 and FIG. 6 show perspective views of thin glass ribbons 1, which have variations in thickness caused by the process. FIG. 5 shows the thin glass ribbon 1 with the drawing rollers acting on the ribbon, in a view corresponding to FIG. 3. The thin glass ribbon 1 has two variations in thickness in the form of thickened portions. The maxima of the thickened portions extend transversely to the thin glass ribbon 1 in the direction from one longitudinal edge 23 to the other longitudinal edge 25. This results in a variation 45 in thickness in the longitudinal direction of the thin glass ribbon 1. These variations in thickness in the longitudinal direction can in particular be caused by the low-frequency vibrations or deviations in the drawing speed explained above.

FIG. 6 shows a different case. In this schematic drawing, the thin glass band 1 is illustrated in perspective in a section perpendicular to the longitudinal direction. In this illustration, the borders 37 can be readily seen as edge regions which are thickened with respect to the central quality region 38 of the thin glass ribbon 1. A rib-like thickened portion extends in the longitudinal direction of the ribbon. Such a thickened portion is manifested in that case in a variation 46 in thickness in the transverse direction of the thin glass ribbon 1. The method and the arrangement of the drawing rollers make it possible to readily reduce both variations 45 in thickness in the longitudinal direction and variations 46 in thickness in the transverse direction. Overall, by means of the method described, a particularly uniform, damage-free glass ribbon can be produced. In general, without being restricted to particular exemplary embodiments, provided for this purpose according to a further aspect of the present disclosure is a thin glass ribbon 1 which can be produced by the method described here or the apparatus and has a quality region with a uniform thickness of at most 250 µm and two borders 37 which form the edges of the thin glass ribbon 1 and are thickened with respect to the quality region 38, the borders 37 not having any traces, in particular any impressions, left by drawing rollers and/or any traces of abrasion originating from ceramic drawing rollers. The glass ribbon 1 is accordingly free from existing damage and residues caused by drawing rollers. Ceramic rollers, which are used to draw glass ribbons, can contain ceramic fibers and sheet silicates, for example mica. The surface of the glass ribbon is accordingly free from these constituents, in particular also is free from traces left by sheet silicates. Further residues may be produced by the thermally resistant binder which holds together the fibers of the drawing rollers. These residues can comprise one or more of the following materials: kaolin, alumina, bentonite, cordierite, mica.

Drawing in the cold region, in particular using soft rollers which adhere well to glass, allows controlled removal from the nozzle at only low drawing speeds. These low drawing speeds also reduce the lateral contraction of the glass ribbon after it is detached. This improves the ratio of the width of the quality region 37 to the width of the borders 38. The absolute width of the borders is also correspondingly reduced in that case. Provided for this purpose, according to a further aspect of the invention in general, without being restricted to the features mentioned above of a border which is free of existing damage, is a thin glass ribbon 1 which can be produced by the method described here or the apparatus and has a quality region with a uniform thickness of at most 250 µm and two borders 37 which form the edges of the thin glass ribbon 1 and are thickened with respect to the quality region 38, at least one of the following features holding true for the dimensions of the borders 37 and of the quality region: the sum of the widths of the borders 37 is less than 20 cm, the ratio of the width of the quality region 38 to the sum of the widths of the borders is at least 1.5:1, preferably at least 3:1. In this respect, according to a preferred embodiment, the thin glass ribbon has a width of at least 50 cm, preferably at least 60 cm.

Certain glasses are particularly suitable for the method, in order to achieve low glass thicknesses and at the same time low variations in glass thickness. A preferred category of glasses contains the following components, figures in percent by weight:

| | |
|---|---|
| $SiO_2$ | 58-68 |
| $B_2O_3$ | 7-9 |
| $Al_2O_3$ | 2-6 |
| $Na_2O$ | 5-8 |
| $K_2O$ | 6-9 |
| ZnO | 4.5-6.5 |
| $TiO_2$ | 2-6. |

Optionally, $Sb_2O_3$ may be incorporated in an amount of 0.4-0.8 percent by weight and/or $Cl^-$ may be incorporated in an amount of 0.05 to 0.15 percent by weight. The glass is preferably free from alkaline earth metal oxides.

Alkali-free or low-alkali glasses can also be processed. A preferred category of such glasses contains the following components in percent by weight:

| | |
|---|---|
| $SiO_2$ | 55-65 |
| $B_2O_3$ | 5-15 |
| $Al_2O_3$ | 12-22 |
| MgO | 2-4 |
| CaO | 3-6 |
| BaO | 2-4. |

According to another preferred embodiment, there is produced by the method or the apparatus a thin glass ribbon 1, the composition of which contains the following components in percent by weight:

| | |
|---|---|
| $SiO_2$ | 55 to 68 |
| $Al_2O_3$ | 13 to 22 |
| $B_2O_3$ | 0 to 8 |
| $Li_2O$ | 0 to 6 |
| $Na_2O$ | 8 to 15 |
| $K_2O$ | 0 to 7 |
| MgO | 0 to 7 |
| CaO | 0 to 3, preferably 0 to 1 |
| ZnO | 0 to 4, preferably 0 to 1 |

-continued

| | |
|---|---|
| ZrO$_2$ | 0 to 4 |
| TiO$_2$ | 0 to 1, preferably substantially free from TiO$_2$. |

Furthermore possibly incorporated in the glass in the proportion of 0 to 1% by weight are: P$_2$O$_5$, SrO, BaO; and refining agents in the proportion of 0 to 1% by weight: SnO$_2$, CeO$_2$ or As$_2$O$_3$ or other refining agents. Glasses with the range of compositions listed above are readily suitable for chemical prestressing and may thus be used for producing thin glass elements with high fracture resistance.

Figure 7:
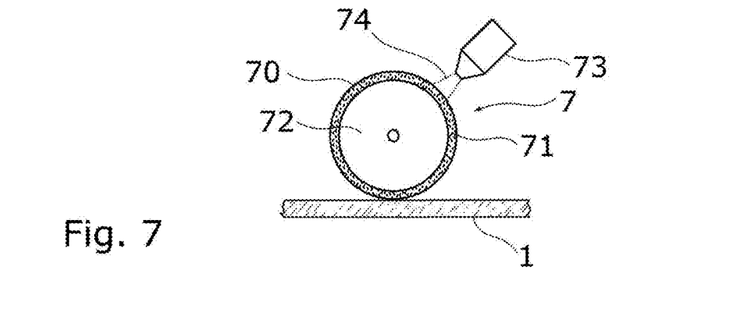
FIG. 7 shows a drawing roller having an elastomer sheath.

As has already been described in relation to FIG. 1, the arrangement of the drawing rollers in a region in which the glass has already been at least partially cooled allows the use of elastomeric materials for the drawing rollers. FIG. 7 shows a drawing roller 7 with a running surface 7 of elastomeric material. Elastomers, however, also have a certain disadvantage in that they exhibit slippage which rises with increasing tensile forces. This may give rise to changes in the drawing speed, which have an effect in turn on the deviations in thickness. In order to keep this effect small, according to one embodiment the drawing rollers comprise a core 72 of rigid material, to which a sheath 71 of elastomeric material is applied. The thickness of the sheath is preferably not greater than 10 mm, in particular is less than 8 mm. With respect to the diameter of the drawing roller or the running surface 70, according to yet another embodiment the thickness of the sheath 71 is not more than ⅛ of this diameter. In the case of a roller diameter of 80 millimeters, for example, a sheath 71 with a thickness of 5 mm may be provided.

In order to avoid damage or rapid degradation of the elastomer material owing to the still-hot or else at least warm thin glass ribbon 1, a cooling device 73 may be provided in order to cool the running surface 70, for example in that the cooling device 73 blows a jet of cooling fluid 74 onto the running surface.

Thin glass elements which are cut from a thin glass ribbon can be used advantageously for a series of applications. One application is the production of thin-film batteries, as is described in WO 2015/197597 A1. With respect to the production of such batteries using a thin glass substrate, the entire contents of this application are also incorporated in the subject-matter of the present disclosure. Similarly, the glasses can be used individually or in a composite material for displays, in particular flexible displays.

LIST OF REFERENCE SIGNS

1 Thin glass ribbon
2 Apparatus for producing a thin glass ribbon
3 Glass
4 Glass melt
5 Nozzle
6 Drawing bulb
7, 9, 11, 13 Drawing roller
17 Tank
18 Upper edge of 17
19 Pulling direction
21 Cooling device
23, 25 Longitudinal edges of 1
27 Drive
29 Storey slab
30 Position at which the glass transition temperature T$_g$ is reached
31 Position at which a temperature of 100° C. is reached
33 Horizontal support device
34 Deflecting roller
35 Border cutting off device
37 Border
38 Quality region
39 Damping element
40 Direction of movement of 1
42 Contact width of the drawing roller
45 Variation in thickness in the longitudinal direction of 1
47 Variation in thickness in the transverse direction of 1
50 Blade
70 Running surface of 7
71 Sheath
72 Core
73 Cooling device for running surface 70
74 Jet of cooling fluid

What is claimed is:

1. A method for producing a flat thin glass ribbon, comprising:
    drawing melted glass downward away from a tank in a pulling direction while applying tensile forces which act in the pulling direction to form the thin glass ribbon having a thickness of at most 250 μm; and
    cooling the thin glass ribbon until a temperature of the thin glass ribbon undershoots a glass transition temperature,
    wherein the tensile forces are transferred to the thin glass ribbon by at least two pairs of drawing rollers, the at least two pairs of drawing rollers are spaced apart transversely to the pulling direction and contact the thin glass ribbon on longitudinal edges of the thin glass ribbon, and
    wherein the thin glass ribbon only makes contact with the at least two pairs of drawing rollers at a position where the temperature of the thin glass ribbon is below the glass transition temperature and at most at or below 500° C.

2. The method of claim 1, wherein the thickness is at most 70 μm.

3. The method of claim 1, wherein the thickness is at most 50 μm.

4. The method of claim 1, wherein the tank is a trough and wherein the step of drawing the melted glass away from the tank comprises:
    overflowing the melted glass from the trough so that the melted glass emerges at a top of the trough and runs over two sides of the trough forming a glass stream from each of the two sides;
    combining the glass stream from the two sides underneath the trough to form the thin glass ribbon.

5. The method of claim 1, wherein the tank comprises an elongated nozzle and wherein the step of drawing the melted glass away from the tank comprises:
    flowing the melted glass from the elongate nozzle away in a downward direction.

6. The method of claim 1, wherein the thin glass ribbon only makes contact with the at least two pairs of drawing rollers drawing rollers where the temperature of the thin glass ribbon is at most at or below 100° C.

7. The method of claim 1, wherein the thin glass ribbon only makes contact with the at least two pairs of drawing rollers at a position where the temperature of the thin glass ribbon is below a strain point.

8. The method of claim 1, further comprising deflecting the thin glass ribbon from a vertical to a horizontal position after passing the at least two pairs of drawing rollers.

9. The method of claim 8, further comprising:
guiding the thin glass ribbon horizontally in a freely hanging manner after being deflected to the horizontal position; and
cutting off borders from the thin glass ribbon at the longitudinal edges while the thin glass ribbon is in the horizontal position.

10. The method of claim 1, wherein the drawing step comprises a feature selected from a group consisting of:
drawing the thin glass ribbon at a drawing speed in a range of 0.4 meters per minute to 50 meters per minute;
rotating the at least two pairs of drawing rollers at a rotational speed in a range of 1.5 revolutions per minute to 180 revolutions per minute;
adjusting the drawing speed of the thin glass ribbon based on the thickness so that a product of the drawing speed, in meters per minute, and the thickness, in micrometers, is between 200 and 1000;
adjusting the drawing speed of the thin glass ribbon based on the thickness so that a product of the drawing speed, in meters per minute, and the thickness, in micrometers, is between 500 to 900; and
any combinations thereof.

11. The method of claim 1, further comprising mechanically dampening transmission of vibrations to the thin glass ribbon at frequencies smaller than 1 hertz by at least 10 dB.

12. The method of claim 1, wherein the at least two pairs of drawing rollers have a contact width in a range of 10 mm to 50 mm.

13. The method of claim 1, further comprising adjusting the at least two pairs of drawing rollers to the position where the temperature of the thin glass ribbon is at most at or below 500° C.

14. An apparatus for producing a flat thin glass ribbon, comprising:
a tank configured to receive and/or produce a glass melt so that the glass melt is drawn off downward to form a thin glass ribbon;
a cooling device configured to the thin-glass ribbon; and
a pulling device configured to exert tension on the thin glass ribbon so that the thin glass ribbon is drawn to a thickness of at most 250 μm,
wherein the pulling device comprises at least two pairs of drawing rollers that are spaced to contact edges of the thin glass ribbon,
wherein the pulling device is arranged downstream, in a pulling direction, of the cooling device and is positioned to only make contact with the thin glass ribbon at position where the thin glass ribbon has a temperature below the glass transition temperature and of at most 500° C.

15. The apparatus of claim 14, wherein the pulling device is arranged underneath the tank so that the at least two pairs of drawing rollers exert downward vertical tension on the thin glass ribbon.

16. The apparatus of claim 14, wherein the tank comprises an overflow trough configured so that the glass melt emerges at a top of the overflow trough, runs in two glass streams over sides of the overflow trough, and combine underneath the overflow trough to form the thin glass ribbon.

17. The apparatus of claim 14, wherein the tank comprises an elongate nozzle from which the glass melt flows away downward.

* * * * *